(12) United States Patent
Hale

(10) Patent No.: X8570
(45) Date of Patent: Jan. 7, 1835

(54) THRASHING MACHINE

(76) Inventor: Luke Hale

Luke Hale. of Hillsborough New Hampshire
Letters Patent.

The schedule referred to in these Letters Patent and mak-
ing part of the same, containing a description in the words
of the said Luke Hale, himself of his improvement in the ma-
chine for Thrashing Grain.

To all whom it may concern.

Be it known that I Luke Hale of Hollis in the County
of Hillsborough and State of New Hampshire, have invented
an improvement in the machine for thrashing grain, it
being a portable machine, and the following is a full and
exact description of my said invention to wit.

The frame or box is made of common boards three and
half feet long, four and half feet high, and eighteen inches
wide. made square with a board in the centre, standing per-
pendicular, sixteen inches wide to fill, it being the width
of the inside of the box and runs below the box one foot
to form a leg; at one end are two posts four inches wide
within the box, and the same length at the bottom as the
sixteen inch board, and running up to the top of the box
which forms all the standing posts within the square box
And inside of the two posts is another box, half within and
half without three feet and a half long, running to the
centre of the square box, and as high as the square box,
and as low as the floor or bottom of the posts, and is nine
inches wide outside, with the upper corner circular. the
inside of the lower corner also. In the centre of the narrow
box, are placed the beaters and cleats, the beaters which
consist of four, are placed in a cast iron hub, the beaters
are round iron, with a shaft through the hub, with a
whirl on the shaft outside of the box, to band to.
a A hopper is in the side of the square box, the grain after being beaten, is thrown up by the beaters, upon a revolving or endless seive, which sift and carry off the straw. Below the endless seives is a fan enclosed in a circula case which fans out the dust and the grain comes out at the bottom of the square box.

What I claim as my invention, is the manner in which the Machine is arranged.

Witnesses
Benjamin M. Farley
William Ames

Luke Hale

Gd.
M.G.

[468 w.